May 18, 1954   W. H. CHURCHILL   2,678,798
FASTENING DEVICE
Filed May 12, 1951
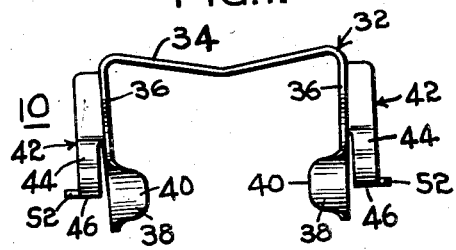
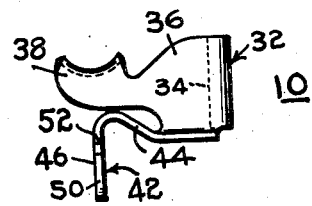
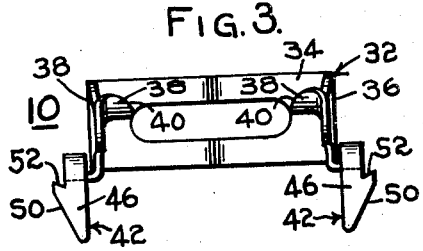
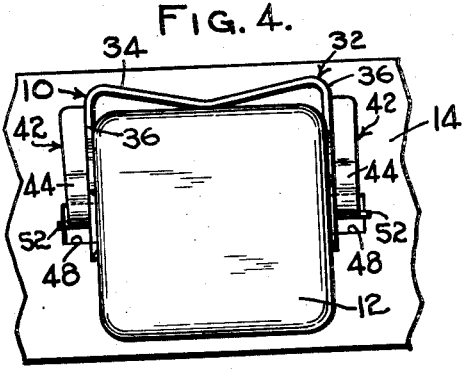
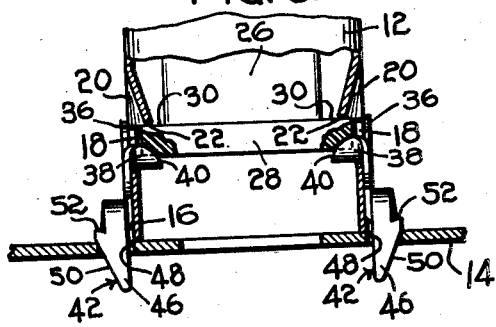
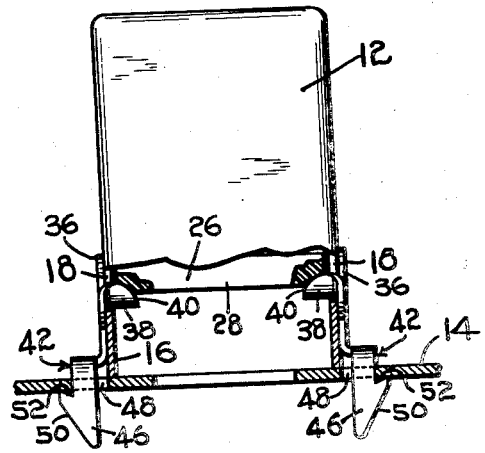
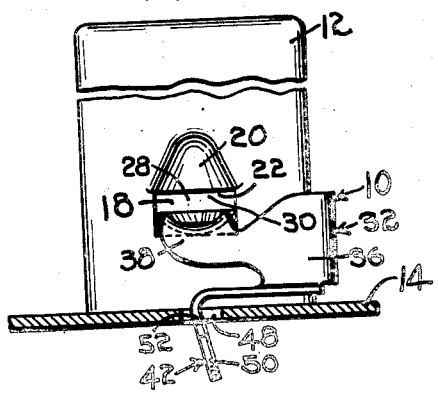
INVENTOR:
WILMER H. CHURCHILL,
BY Robert E Ross
AGENT.

Patented May 18, 1954

2,678,798

UNITED STATES PATENT OFFICE 2,678,798

FASTENING DEVICE

Wilmer H. Churchill, Wellesley, Mass., assignor to United-Carr Fastener Corporation, Cambridge, Mass., a corporation of Massachusetts Application May 12, 1951, Serial No. 226,054

5 Claims. (Cl. 248—361)

This invention relates generally to fastening devices, and has particular reference to a sheet metal fastener for securing an electronic shield can or the like to a support.

The object of the invention is to provide a sheet metal fastener which is adapted to engage opposite sides of a shield can or the like and to be snapped into spaced openings in a support to securely retain the can thereon.

A further object of the invention is to provide a sheet metal fastener of this general type having a generally U-shaped body portion having means on the arms thereof for entering openings in opposite sides of the can and means extending from the arms in a direction generally perpendicular to the plane of the U-shaped body portion for snapping engagement into a pair of spaced openings in a support.

A still further object of the invention is to provide a one-piece sheet metal fastener of this type having a generally U-shaped body portion for assembly onto a shield can in such a manner that the plane of the body portion is substantially parallel to a support after assembly of the can therewith, and resilient means on the opposing arms of the U-shaped body portion for snapping engagement in spaced openings in the support, in which said resilient means is capable of flexing movement in a direction perpendicular to the plane of the support.

Other objects of the invention will, in part, be obvious, and will, in part appear hereinafter.

In the drawing:

Fig. 1 is a perspective view of a fastening device embodying the features of the invention;

Fig. 2 is a view of the fastener of Fig. 1 as seen from the right side;

Fig. 3 is a view of the fastener of Fig. 2 as seen from the left side;

Fig. 4 is a top plan view of a shield can having the fastener of Fig. 1 assembled thereon in which the can and fastener are in position for attachment to a support;

Fig. 5 is a view in section taken on line 5—5 of Fig. 4;

Fig. 6 is a view similar to Fig. 5 in which the fastener has been attached to the support; and Fig. 7 is a view of the assembly of Fig. 6 as seen from the left side.

Referring to the drawing, there is illustrated a one-piece sheet metal fastening device 10 which is particularly adapted for use in securing an electronic shield can 12 or the like to a support plate 14. The can 12 which is open at one end 16 is formed of sheet metal and is generally rectangular or square in cross-section, with a pair of opposing openings 18 in opposite sides thereof which are spaced from the bottom of the can a predetermined distance, and inwardly formed portions 20 above the openings to form internal stops 22. The can 12 is used to cover electronic apparatus such as a small transformer or the like which must be shielded to eliminate the undesirable effects of stray magnetic fields. The apparatus is usually provided with a molded plastic housing or frame 26, which has a base 28 with abutments 30 disposed thereon to bear against the stops 22 when the apparatus is assembled into the can to properly position the apparatus therein.

The fastener 10 comprises generally a U-shaped body portion 32 formed of a flat strip of sheet metal, having a base portion 34 and a pair of spaced arms 36 extending from opposite ends of the base. Each arm 36 is provided with a can-engaging member 38, and the members 38 extend inwardly toward each other for entering the openings 18 in the opposite sides of the can. The members 38 have rounded ends 40, and the sides of the members are bent upwardly so that the members 38 are arcuate in a direction longitudinal of the arms 38 for a purpose to be hereinafter described.

In the following description the term "the plane of the U-shaped body" refers to a plane which substantially longitudinally bisects both arms 36 and the base 34.

To provide means for securing the fastener to the support 14, the arms 36 are provided with support-engaging legs 42 which are attached thereto in spaced relation to the ends, and extend generally alongside and slightly below the arms. The legs 42 have a portion 44 which is inclined upwardly in relation to the plane of the U-shaped body portion, and a support-engaging end portion 46 which is turned downwardly from the uppermost end of the inclined portion to extend substantially perpendicular to the plane of the U-shaped body portion and to protrude beneath the body to enter spaced openings 48 in the support 14. The end portions 46 are each provided with lead-in edges 50 which lead to shoulders 52 for snapping engagement with the support in the openings therein. The legs 42 are resilient so that the end portions 46 are capable of flexing movement in a direction perpendicular to the plane of the U-shaped body portion for a purpose to be hereinafter described.

To assemble the can onto the support, the fastener 10 is initially assembled onto the can, so that the arms 36 straddle the can from one side and the can-entering members 38 enter the openings 18 in the sides of the can (see Fig. 4). As illustrated in Fig. 5, the rounded ends of the arcuate member pass under the bottom of the base 28 of the apparatus and force the abutments 30 against the stops 22 to retain the apparatus 24 in the can. When the fastener is assembled in this manner, the end portions 46 of the legs 42 protrude downwardly from the can, so that the can may then be seated on the support with the ends 46 of the legs entering the spaced openings 48. The dimensions of the fastener relative to the thickness of the support plate and the distance from the openings 18 in the can to the bottom of the can are such that when the fastener is assembled onto the can and the can is seated on the support plate, the ends 46 of the legs do not extend into the openings 48 far enough to allow the shoulders 52 on the legs to engage the edge of the support plate (see Fig. 5). Hence, the legs 42 must be flexed downwardly to allow the shoulders to pass the edge of the panel. The relative distance between the ends of the legs 42 and the distance between the openings 48 in the support is such that as the legs are flexed downwardly to force the ends thereof into the openings, the lead-in edges 50 engage the adjacent edge of the support plate and cause the legs to also flex sideways; hence, when the shoulder passes the lower side of the plate, the ends of the legs spring outwardly so that the shoulders 52 snap into engagement behind the edge of the plate (see Fig. 6). The can is thereby retained securely on the panel and is held in tight contact therewith by reason of the flexed condition of the legs 42 to provide a good electrical connection between the can and the plate to ground stray magnetic fields.

The can may be easily released from the support plate by squeezing the ends of the legs together from the under side of the panel, and such disassembly may be accomplished without disturbing the engagement of the fastener with the can.

The fastener 10 may be economically and rapidly produced on automatic machines from a continuous strip of sheet metal, such as sheet steel or aluminum.

Since certain obvious changes may be made in the device without departing from the scope of the invention, it is intended that all matter contained herein be interpreted in an illustrative and not a limiting sense.

I claim:

1. A fastening device for attaching a shield can to a support, said device having a substantially U-shaped body portion adapted for assembly with the can and the support so that the plane of the U-shaped body portion is substantially parallel to the plane of the support, said body portion comprising a base and a pair of arms extending from the base in spaced relation to be disposed on opposite sides of the can, said arms having can-engaging portions which extend inwardly toward each other for entering openings in opposite sides of the can, and resilient support-engaging members disposed on the arms, said support-engaging members being attached to the arms in spaced relation to the ends thereof and extending generally in the same direction as the arms, the ends of said support-engaging members being turned downwardly to extend substantially perpendicular to the plane of the U-shaped portion, said support-engaging members having means on the end thereof for snapping engagement in spaced openings in the support, the resiliency of said support-engaging members allowing said means for snapping engagement with the support a limited amount of flexing in a direction perpendicular to the plane of the U-shaped body portion.

2. A fastening device for attaching a shield can to a support, said device having a substantially U-shaped body portion adapted for assembly with the can and the support so that the plane of the U-shaped body portion is substantially parallel to the plane of the support, said body portion comprising a base and a pair of arms extending from the base in spaced relation to be disposed on opposite sides of the can, said arms having can-engaging portions which extend inwardly toward each other for entering openings in opposite sides of the can, and resilient support-engaging legs disposed on the arms, said support-engaging legs being attached to the arms in spaced relation to the ends thereof and extending generally alongside the arms, the ends of said legs being turned downwardly to extend substantially perpendicular to the plane of the U-shaped body portion, each of the ends of said legs having a lead-in portion leading to a shoulder portion to enable said ends to be snapped into engagement into spaced openings in the support, the resilience of said legs allowing flexing movement of said ends in a direction perpendicular to the plane of said U-shaped body portion.

3. A fastening device as set forth in claim 1 in which the resilient support-engaging members extend alongside the arms and are inclined upwardly in relation to the plane of the U-shaped body portion, and then are turned downwardly to form the end portions which extend substantially perpendicularly to the plane of the U-shaped body portion.

4. An electronic assembly, comprising a shield can, a support, and a fastening device retaining the can on the support, said can having opposed openings in opposite sides thereof and being seated on the support between spaced openings therein, said fastening device comprising a generally U-shaped body portion assembled with the can and the support so that the plane of the U-shaped body portion is substantially parallel to the plane of the support, said body portion comprising a base and a pair of arms extending from the base, said arms being disposed on opposite sides of the can and having can-engaging portions extending inwardly toward each other into the opposed openings in the side of the can, and resilient support-engaging legs disposed on the arms, said support-engaging legs being attached to the arms in spaced relation to the ends and extending generally alongside the arms and being inclined upwardly away from the plane of the support, the ends of said legs being turned downwardly toward the support and extending into the openings therein, said ends having inclined edge portions leading to shoulder portions for snapping engagement in the openings; said shoulder portions being so spaced on the legs that the ends of the legs must be flexed downwardly for engagement in the openings in the support.

5. In an electronic assembly as set forth in claim 4, a fastening device as set forth therein in which the inwardly extending can-engaging portions have rounded ends and are arcuate in a direction longitudinal of the arms disposed on opposite sides of the can.

References Cited in the file of this patent

UNITED STATES PATENTS

| Number | Name | Date |
| --- | --- | --- |
| 1,203,402 | Post | Oct. 31, 1916 |
| 1,644,899 | Southgate | Oct. 11, 1927 |
| 2,144,171 | Van Uum | Jan. 17, 1939 |
| 2,176,299 | Evans | Oct. 17, 1939 |
| 2,230,898 | MacFadden | Feb. 4, 1941 |
| 2,326,903 | Tinnerman | Aug. 17, 1943 |
| 2,441,420 | Karlin | May 11, 1948 |